(12) United States Patent
Tour et al.

(10) Patent No.: US 9,428,394 B2
(45) Date of Patent: Aug. 30, 2016

(54) HIGHLY OXIDIZED GRAPHENE OXIDE AND METHODS FOR PRODUCTION THEREOF

(75) Inventors: James M. Tour, Bellaire, TX (US); Dmitry V. Kosynkin, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 1143 days.

(21) Appl. No.: 13/321,623

(22) PCT Filed: May 14, 2010

(86) PCT No.: PCT/US2010/034905
§ 371 (c)(1),
(2), (4) Date: Feb. 6, 2012

(87) PCT Pub. No.: WO2011/016889
PCT Pub. Date: Feb. 10, 2011

(65) Prior Publication Data
US 2012/0129736 A1    May 24, 2012

Related U.S. Application Data

(60) Provisional application No. 61/180,505, filed on May 22, 2009, provisional application No. 61/185,640, filed on Jun. 10, 2009.

(51) Int. Cl.
*B82Y 30/00* (2011.01)
*B82Y 40/00* (2011.01)
(Continued)

(52) U.S. Cl.
CPC ............ *C01B 31/0476* (2013.01); *B82Y 30/00* (2013.01); *B82Y 40/00* (2013.01); *C01B 31/043* (2013.01); *C09K 8/032* (2013.01)

(58) Field of Classification Search
None
See application file for complete search history.

(56) References Cited

U.S. PATENT DOCUMENTS 3,404,061 A    10/1968   Shane et al.
3,549,560 A *  12/1970   Monsimer ............ C01B 31/043
                                                    106/476
(Continued)

FOREIGN PATENT DOCUMENTS

CN       1613757 A      5/2005
JP       200253313      2/2002
(Continued)

OTHER PUBLICATIONS

Tour et al.; Improved Synthesis of Graphene Oxide; ACS Nano; 4 (8), pp. 4806-4814; 2010.*
(Continued)

*Primary Examiner* — Guinever S Gregorio
(74) *Attorney, Agent, or Firm* — Winstead PC

(57) ABSTRACT

A highly oxidized form of graphene oxide and methods for production thereof are described in various embodiments of the present disclosure. In general, the methods include mixing a graphite source with a solution containing at least one oxidant and at least one protecting agent and then oxidizing the graphite source with the at least one oxidant in the presence of the at least one protecting agent to form the graphene oxide. Graphene oxide synthesized by the presently described methods is of a high structural quality that is more oxidized and maintains a higher proportion of aromatic rings and aromatic domains than does graphene oxide prepared in the absence of at least one protecting agent. Methods for reduction of graphene oxide into chemically converted graphene are also disclosed herein. The chemically converted graphene of the present disclosure is significantly more electrically conductive than is chemically converted graphene prepared from other sources of graphene oxide.

29 Claims, 9 Drawing Sheets

(51) Int. Cl.
*C01B 31/04* (2006.01)
*C09K 8/03* (2006.01)

(56) References Cited

U.S. PATENT DOCUMENTS

| | | | |
|---|---|---|---|
| 4,146,401 A | 3/1979 | Yamada et al. | |
| 4,439,491 A * | 3/1984 | Wilson | C04B 41/009 252/400.2 |
| 4,895,713 A * | 1/1990 | Greinke | C01B 31/0415 252/502 |
| 5,310,489 A | 5/1994 | Sharif | |
| 2001/0018040 A1 | 8/2001 | Ottinger et al. | |
| 2002/0022122 A1 | 2/2002 | Hirata | |
| 2005/0271574 A1* | 12/2005 | Jang | B82Y 30/00 423/448 |
| 2007/0092432 A1 | 4/2007 | Prud Homme et al. | |
| 2007/0131915 A1* | 6/2007 | Stankovich | C01B 31/0423 252/511 |
| 2008/0008760 A1 | 1/2008 | Bianco | |
| 2010/0303706 A1* | 12/2010 | Wallace | B82Y 30/00 423/445 B |
| 2011/0284805 A1* | 11/2011 | Samulski | B82Y 30/00 252/503 |
| 2012/0063988 A1* | 3/2012 | Tour | B82Y 30/00 423/415.1 |
| 2013/0323159 A1* | 12/2013 | Lee | C01B 31/0446 423/448 |

FOREIGN PATENT DOCUMENTS

| | | |
|---|---|---|
| JP | 200563951 | 3/2005 |
| RU | 2161123 C1 | 12/2000 |
| WO | 0244080 A2 | 6/2002 |
| WO | 20040166049 | 8/2004 |
| WO | 2010022164 A1 | 2/2010 |

OTHER PUBLICATIONS definition mix; Merriam-Webster; Nov. 27, 2015.*
International Search Report and Written Opinion issued by the International Searching Authority for PCT/US2010/034905 on Feb. 28, 2011.
International Preliminary Report on Patentability issued by the International Bureau for PCT/US2010/034905 on Dec. 1, 2011.
Divisional Directorate of Patents, Communication of the substantive examination report, mailed Dec. 1, 2014. Patent application No. MX/a/2011/012432 from PCT internationally filed on May 14, 2010, filed in Mexico on Nov. 22, 2011.
The State Intellectual Property Office of the People's Republic of China, Notice on the First Office Action, Application No. 201080027417.7, Aug. 1, 2014.
Japanese Patent Office, Notice of Rejection, Application No. 2012-511911, Aug. 13, 2014.
Divisional Directorate of Patents, Substantive Examination Report, May 2, 2014, Mexican Patent Application No. MX/a/2011/012432 from PCT/US2010/034905 filed May 14, 2010.
The State Intellectual Property Office of the People's Republic of China, Notice on the Second Office Action, Application No. 201080027417.7, Apr. 23, 2015 (translated and original version included).
Division of Directorate of Patents, Communication of the substantive examination report for Mexican patent application No. MX/A/2011/012432, Dec. 1, 2014 (translated and original version included).
European Patent Office, Communication pursuant to Rule 114(2) EPC, "Third Party Observations for Application No. EP 10806772.9", Oct. 13, 2015.
Request to Amend Application Before Grant, Singapore Application No. 10201402481P, Jul. 23, 2015.
Request for Supplementary Examination Report, Singapore Application No. 10201402481P, Jul. 23, 2015.
Intellectual Property Office of Singapore, Notice of Eligibility for Grant, "Highly Oxidized Graphene Oxide and Methods for Production Thereof", Singapore Application No. 10201402481P, Nov. 11, 2015.
Intellectual Property Office of Singapore, Supplementary Examination Report, Singapore Application No. 10201402481P, Nov. 6, 2015.
European Patent Office, European Search Report for application No. EP 10806772.9, Dec. 22, 2015.
China State Intellectual Property Office, Notice on the Third Office Action, Nov. 10, 2015, Application No. 201080027417.7.
Cho, D., et al., "Protective behavior of thermal oxidation in oxidized PAN fibers coated with phosphoric acid", Carbon, vol. 34, No. 9, Jan. 1, 1996, pp. 1151-1154.

* cited by examiner

FIGURES 4A – 4F
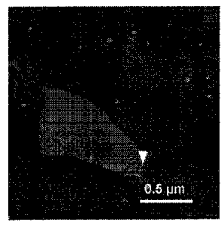
FIGURE 4C
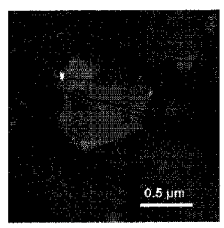
FIGURE 4B
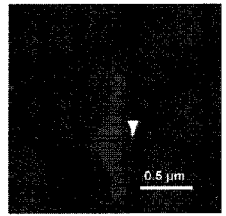
FIGURE 4A
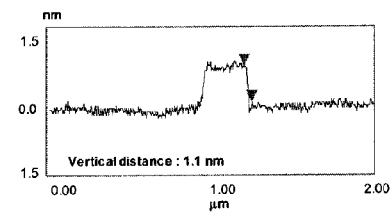
FIGURE 4F
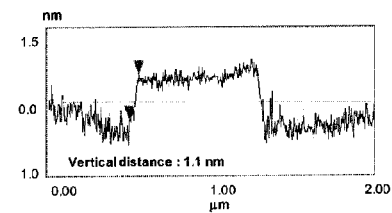
FIGURE 4E
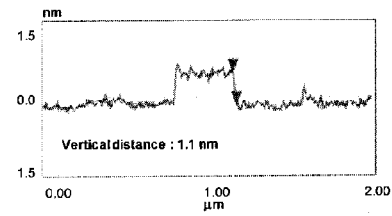
FIGURE 4D
FIGURE 5
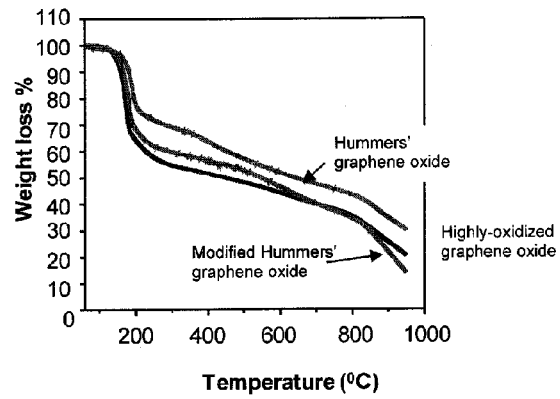

FIGURE 8
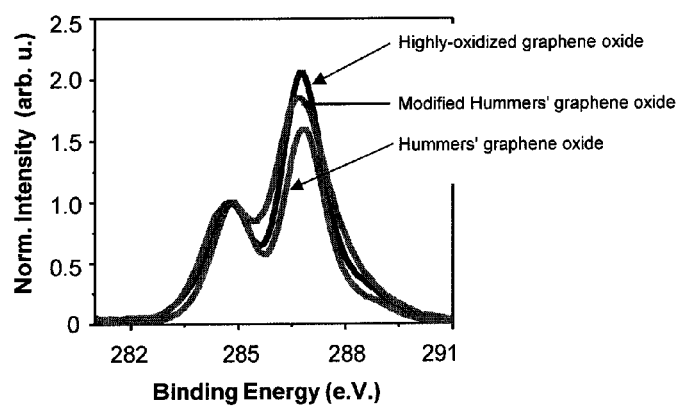
FIGURES 9A – 9C
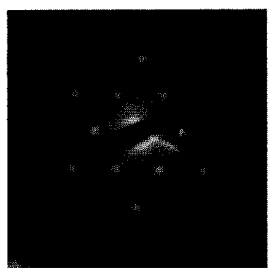
FIGURE 9A
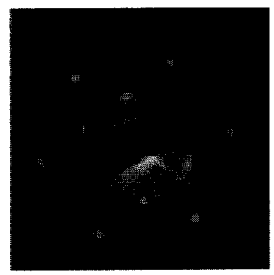
FIGURE 9B
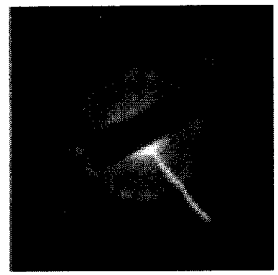
FIGURE 9C
FIGURES 10A – 10C
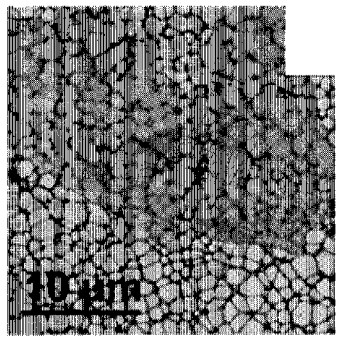
FIGURE 10A
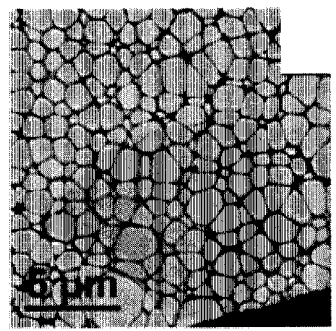
FIGURE 10B
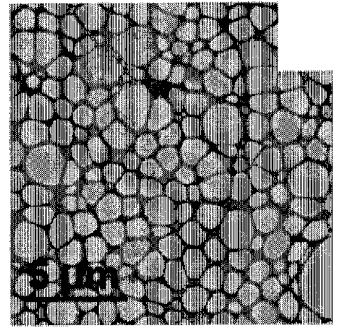
FIGURE 10C

HIGHLY OXIDIZED GRAPHENE OXIDE AND METHODS FOR PRODUCTION THEREOF

CROSS-REFERENCE TO RELATED APPLICATIONS

This application claims priority to U.S. Provisional Patent Applications 61/180,505, filed May 22, 2009, and 61/185,640, filed Jun. 10, 2009, each of which is incorporated by reference in its entirety herein.

STATEMENT REGARDING FEDERALLY SPONSORED RESEARCH

This invention was made with Government support under grant number FA8650-05-D-5807, awarded by the United States Department of Defense; grant number DE-FC-36-05G015073, awarded by the United States Department of Energy, grant number N000014-09-1-1066, awarded by the United States Department of Defense, grant number FA9550-09-1-0581, awarded by the United States Department of Defense, and grant number 2007-G-010, awarded by the Federal Aviation Administration. The Government has certain rights in the invention.

BACKGROUND

Graphene is a single- or few-layer structure consisting of sheets of $sp^2$ hybridized carbon atoms. This material has been the subject of considerable research activity in recent years due to its useful mechanical and electrical properties. A ready source of graphene is bulk graphite, which consists of a large number of graphene sheets held together through van der Waals forces. Single- and few-layer graphene sheets have been prepared in microscopic quantities by mechanical exfoliation of bulk graphite (commonly referred to as the "Scotch-tape" method) and by epitaxial chemical vapor deposition. However, these routes are not suitable for large-scale manufacturing of graphene.

To date, methods for preparing bulk quantities of graphene have centered on chemical exfoliation of graphite. The most common approach for exfoliation of graphite has been to use a strong oxidizing agent to produce graphene oxide, a non-conductive and hydrophilic carbon material. Although the exact chemical structure of graphene oxide is difficult to conclusively determine, it is at least qualitatively evident that the regular $sp^2$ structure is disrupted in graphene oxide with epoxides, alcohols, carbonyls and carboxylic acid groups. The disruption of the lattice in bulk graphite is reflected in an increase in interlayer spacing from 0.335 nm in bulk graphite to more than 0.625 nm in graphene oxide. Graphene oxide was first prepared in 1859 through adding potassium chlorate to a slurry of graphite in fuming nitric acid. The synthesis was improved in 1898 by including sulfuric acid in the reaction mixture and adding the potassium chlorate portionwise over the course of the reaction. The most common method used today is that reported by Hummers in which bulk graphite is oxidized by treatment with $KMnO_4$ and $NaNO_3$ in concentrated $H_2SO_4$ (Hummers' method). It should be noted that all three of these procedures involve the generation of the toxic and/or explosive gas(es): $NO_2$, $N_2O_4$, and/or $ClO_2$.

Non-conducting graphene oxide may be transformed back into a conductive graphene material, either in thin films or in bulk, through chemical reduction to form chemically converted graphene. However, chemical reduction does not fully restore the pristine $sp^2$ structure of bulk graphite, and significant defects in the form of holes are present in the chemically converted graphene structure. These defects arise during chemical exfoliation of bulk graphite and are not repaired during the reduction of graphene oxide into chemically converted graphene. The defects in both graphene oxide and chemically converted graphene diminish the desirable mechanical and electrical properties of these materials compared to pristine graphene.

In view of the foregoing, chemical methods for exfoliating bulk graphite to produce highly oxidized graphene oxide having a more regular $sp^2$ structure would be of significant benefit in the art. Graphene oxide having a more regular $sp^2$ structure would be capable of being reduced to chemically converted graphene having properties more commensurate with pristine graphene sheets. Further, methods for production of graphene oxide that avoid generation of toxic byproducts would also confer significant advantages to such methods.

SUMMARY

In various embodiments, methods for forming graphene oxide, chemically converted graphene, and functionalized, chemically converted graphene are described herein. Graphene oxide, chemically converted graphene, and functionalized, chemically converted graphene compositions are also described herein.

In some embodiments, the methods for forming graphene oxide include providing a graphite source, providing a solution containing at least one oxidant and at least one protecting agent, mixing the graphite source with the solution, and oxidizing the graphite source with the at least one oxidant in the presence of the at least one protecting agent to form graphene oxide.

In other various embodiments, methods for forming graphene oxide include providing a graphite source, providing a solution containing at least one acid solvent, at least one oxidant and at least one protecting agent, mixing the graphite source with the solution, and oxidizing the graphite source with the at least one oxidant in the presence of the at least one protecting agent to form graphene oxide. The at least one protecting agent is operable for protecting vicinal diols.

In still other various embodiments, methods for forming graphene oxide include providing a graphite source, providing a solution containing at least one acid solvent, potassium permanganate and at least one protecting agent, mixing the graphite source with the solution, and oxidizing the graphite source with the potassium permanganate in the presence of the at least one protecting agent to form graphene oxide. The at least one acid solvent may be, for example, oleum, sulfuric acid, fluorosulfonic acid, trifluoromethanesulfonic acid, and combinations thereof. The at least one protecting agent may be, for example, trifluoroacetic acid; phosphoric acid; orthophosphoric acid; metaphosphoric acid; polyphosphoric acid; boric acid; trifluroacetic anhydride; phosphoric anhydride; orthophosphoric anhydride; metaphosphoric anhydride; polyphosphoric anhydride; boric anhydride; mixed anhydrides of trifluoroacetic acid, phosphoric acid, orthophosphoric acid, metaphosphoric acid, polyphosphoric acid, and boric acid; and combinations thereof.

In other various embodiments, mixtures containing graphene oxide; functionalized graphene oxide; chemically converted graphene; functionalized, chemically converted graphene and combinations thereof are described herein that are operable to slow the filtration rate of a liquid mixture such as, for example, an aqueous liquid mixture, a non-aqueous liquid mixture, and combinations thereof. In some embodiments, at least two different particle size ranges of the graphene oxide; functionalized graphene oxide; chemically converted graphene; and functionalized, chemically-converted graphene may be used in the mixtures.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIGS. 4A-4C show illustrative tapping mode AFM topographic images for highly-oxidized graphene oxide (FIG. 4A), Hummers' graphene oxide (FIG. 4B) and modified Hummers' graphene oxide (FIG. 4C); FIGS. 4D-4F show corresponding illustrative AFM height profiles for highly-oxidized graphene oxide (FIG. 4D), Hummers' graphene oxide (FIG. 4E) and modified Hummers' graphene oxide (FIG. 4F);

FIG. 5 shows illustrative thermogravimetric analyses (TGA) for highly-oxidized graphene oxide, Hummers' graphene oxide, and modified Hummers' graphene oxide;

FIG. 8 shows illustrative deconvoluted XPS spectra for highly-oxidized graphene oxide, Hummers' graphene oxide and modified Hummers' graphene oxide normalized with respect to the C1s graphitic $sp^2$ peak;

FIGS. 9A-9C show illustrative SAED patterns for highly-oxidized graphene oxide (FIG. 9A), Hummers' graphene oxide (FIG. 9B) and modified Hummers' graphene oxide (FIG. 9C);

FIGS. 10A-10C show illustrative TEM images for highly-oxidized graphene oxide (FIG. 10A), Hummers' graphene oxide (FIG. 10B) and modified Hummers' graphene oxide (FIG. 10C) obtained on a lacey-carbon TEM grid;

DETAILED DESCRIPTION

Figure 1:
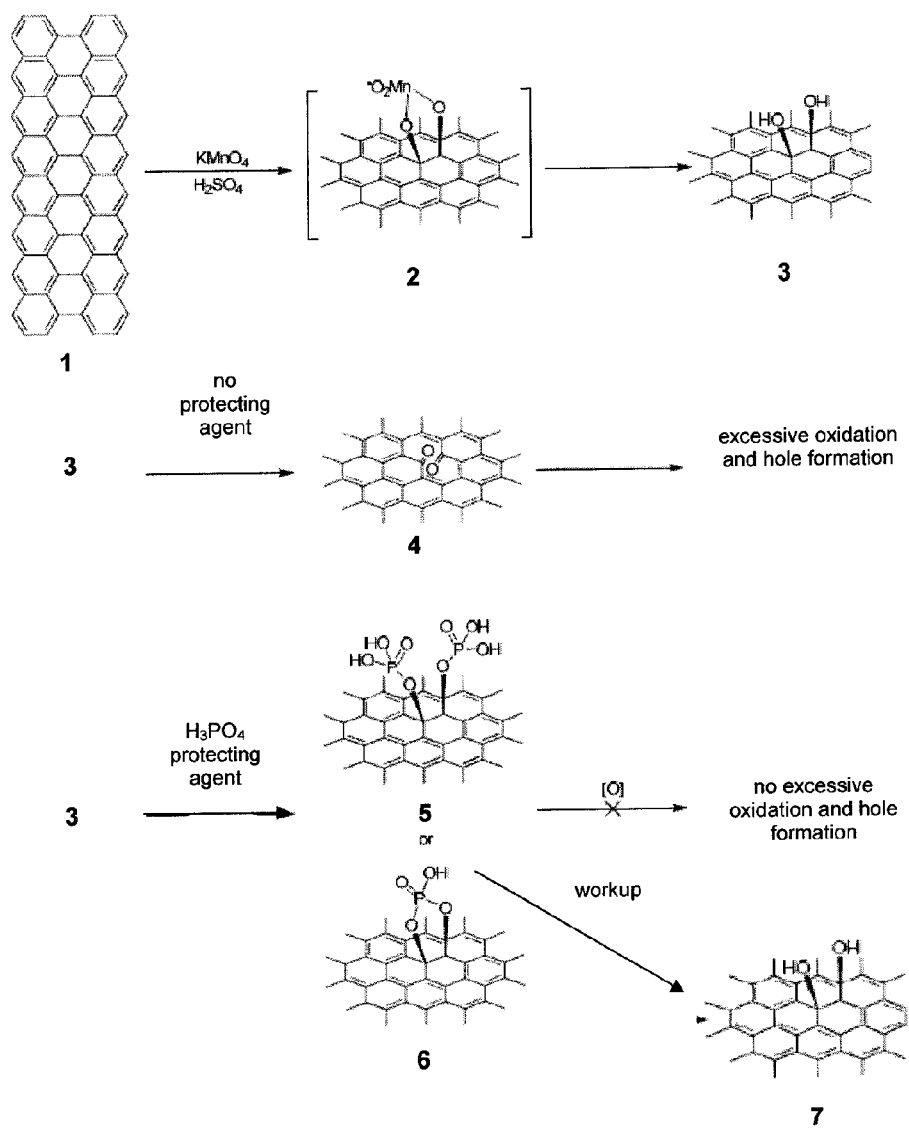
FIG. 1 shows a non-limiting proposed mechanism demonstrating how inclusion of a protecting agent may provide improved chemoselectivity in the oxidation of graphite.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification or if the incorporation is necessary for maintaining validity.

"Graphene oxide," as used herein, refers to, for example, a graphite oxide containing less than about 10 layers of $sp^2$ hybridized carbon sheets.

"Chemically converted graphene," as used herein, refers to, for example, graphene produced by reduction of graphene oxide. Reduction of graphene oxide to chemically converted graphene removes at least a portion of the oxygen functionalities present in the graphene oxide.

"Functionalized, chemically converted graphene," as used herein, refers to, for example, chemically converted graphene that has been derivatized with a plurality of functional groups.

"Functionalized graphene oxide" as used herein, refers to, for example, graphene oxide that has been derivatized with a plurality of functional groups.

"Vicinal diol," as used herein, refers to, for example, a chemical compound having two alcohol functional groups deposed in a 1,2-arrangement.

In various embodiments, methods for forming graphene oxide are described herein. In some embodiments, the methods include providing a graphite source, providing a solution containing at least one oxidant and at least one protecting agent, mixing the graphite source with the solution, and oxidizing the graphite source with the at least one oxidant in the presence of the at least one protecting agent to form graphene oxide.

As will be described hereinafter, graphene oxide prepared by the methods presented herein has different properties than that presently known in the art. In the Experimental Examples herein, Applicants provide a detailed comparison of the present graphene oxide versus graphene oxide prepared by Hummers' method, a common method for synthesizing graphene oxide, and a modification of Hummer's method. Other methods for production of graphene oxide, chemically converted graphene and functionalized, chemically converted graphene are described in commonly-assigned PCT publication WO 2009/089391, which is incorporated herein by reference.

In general, graphene oxide of the present disclosure is more highly oxidized than is graphene oxide prepared in the absence of at least one protecting agent. As an initial, qualitative point of distinction between the present graphene oxide and that previously known, the graphene oxide of the present disclosure is light brown in color, similar to that of peanut butter, whereas the previously known graphene oxide is dark brown in color. The higher degree of oxidation is reflected in the different color of the present graphene oxide compared to that of previously known graphene oxide materials.

Methods of the present disclosure provide improved chemoselectivity for graphite oxidation over methods currently known in the art. Without being bound by theory or mechanism, Applicants believe that the at least one protecting agent of the presently described methods prevents the formation of holes in the graphene basal plane by providing in situ protection of vicinal diols that form during oxidative treatment of graphite. FIG. 1 shows a non-limiting proposed mechanism demonstrating how inclusion of a protecting agent may provide improved chemoselectivity in the oxidation of graphite. In the non-limiting mechanism illustrated in FIG. 1, oxidation of a section of a graphite basal plane 1 with $KMnO_4$ is demonstrated in the absence and in the presence of a protecting agent ($H_3PO_4$). With continued reference to FIG. 1, oxidation of graphite basal plane 1 with $KMnO_4$ results in formation of manganate ester 2, which leads to vicinal diol 3. A protonated diol may also be an intermediate. Additional edge and basal plane functionality has been omitted from the structure of vicinal diol 3 for purposes of clarity. If left unprotected, vicinal diol 3 may be oxidized to diketone 4, which leads to formation of a hole in the graphene basal plane.

If a protecting agent operable for protecting alcohols or diols is included in the reaction mixture, hole formation may be eliminated or minimized. With continued reference to FIG. 1, if a protecting agent such as, for example, phosphoric acid is included in the reaction mixture, the protecting agent may react with the vicinal diol in situ to prevent further oxidation and preclude hole formation. As shown in FIG. 1, the phosphoric acid protecting agent may protect the vicinal diol via chelation in chelated vicinal diol 6 or by individual protection of each alcohol of the vicinal diol in protected vicinal diol 5. Regardless of the manner of protection, excessive basal plane oxidation in the graphene sheets is precluded, while the overall level of oxidation is increased relative to that of other methods for forming graphene oxide from bulk graphite. During workup of chelated vicinal diol 6 and/or protected vicinal diol 5, the protecting group is released in situ to provide graphene oxide 7. In graphene oxide 7, additional oxidized functionality has been omitted for clarity.

In various embodiments, the least one oxidant may be an oxidant such as, for example, permanganate, ferrate, osmate, ruthenate, chlorate, chlorite, nitrate, osmium tetroxide, ruthenium tetroxide, lead dioxide, and combinations thereof. For any of the referenced oxidants that are cations or anions, any counteranion suitable for forming a salt of the oxidant cation or anion may be used in practicing the methods of the present disclosure. However, one of ordinary skill in the art will recognize that certain salts may be more advantageous than others in such properties as, for example, their solubility and stability. In some embodiments, the at least one oxidant is potassium permanganate. In general, the at least one oxidant of the present disclosure is an oxidant that mediates a cis-oxidation of double bonds.

In some embodiments, solutions of the present disclosure further include at least one acid solvent. The at least one acid solvent may be, for example, oleum (fuming sulfuric acid), sulfuric acid, chlorosulfonic acid, fluorosulfonic acid, trifluoromethanesulfonic acid, and combinations thereof. In some embodiments, the at least one acid solvent may be sulfuric acid. In some embodiments, the at least one acid solvent is sulfuric acid and the at least one oxidant is potassium permanganate. In various embodiments, oleum may have a free sulfur trioxide concentration ranging from about 0.1% to about 20%. In various embodiments, sulfuric acid may have a concentration greater than about 90% (v/v). Although the Experimental Examples hereinbelow have typically utilized potassium permanganate as the at least one oxidant and sulfuric acid as the at least one acid solvent, one of ordinary skill in the art will recognize that many different combinations of oxidants, acid solvents and protecting agents may be used to achieve a similar result in preparing graphene oxide while operating within the spirit and scope of the present disclosure.

In various embodiments, the at least one protecting agent of the present methods is operable for protecting vicinal diols. In some embodiments, the at least one protecting agent is operable for protecting vicinal diols in the presence of at least one acid solvent. As shown in FIG. 1, the at least one protecting agent chelates the vicinal diols in some embodiments. However, in other embodiments, the at least one protecting agent individually protects each alcohol of the vicinal diols. Regardless of the mechanism through which the at least one protecting agent functions, the end result is the production of graphene oxide having a regular structure with hole formation minimized or eliminated in comparison to graphene oxide prepared in the absence of a protecting agent.

In some embodiments, the at least one protecting agent is a non-oxidizing acid. In some embodiments, the at least one protecting agent is an anhydride or mixed anhydride that is convertible to a non-oxidizing acid operable for serving as a protecting agent. Such protecting agents are operable for protecting vicinal diols in the presence of a strong acid solvent such as, for example, fuming sulfuric acid, sulfuric acid, chlorosulfonic acid, fluorosulfonic acid and trifluoromethanesulfonic acid. Illustrative protecting agents useful in any of the various embodiments of the present disclosure include, for example, trifluoroacetic acid; phosphoric acid; orthophosphoric acid; metaphosphoric acid; polyphosphoric acid; boric acid; trifluroacetic anhydride; phosphoric anhydride; orthophosphoric anhydride; metaphosphoric anhydride; polyphosphoric anhydride; boric anhydride; mixed anhydrides of trifluoroacetic acid, phosphoric acid, orthophosphoric acid, metaphosphoric acid, polyphosphoric acid, and boric acid; and combinations thereof. In some embodiments, the at least one protecting agent may be, for example, phosphoric acid, boric acid, trifluoroacetic acid, and combinations thereof. Although the Experimental Examples hereinbelow have utilized phosphoric acid as an illustrative protecting agent, similar results have been obtained using trifluoroacetic acid and boric acid as the protecting agent. In some embodiments, a salt of any of the aforesaid protecting agents may be used in the various methods presented herein.

In various embodiments, oxidizing the graphite source takes place at a temperature between about −50° C. and about 200° C. In some embodiments, oxidizing takes place at a temperature between about 0° C. and about 100° C. In some embodiments, oxidizing takes place at a temperature between about 30° C. and about 85° C. In some embodiments, oxidizing takes place at a temperature between about 30° C. and about 50° C. In some embodiments, oxidizing takes place at a temperature between about 40° C. and about 55° C. In some embodiments, oxidizing takes place at a temperature between about 25° C. and about 70° C. In some embodiments, oxidizing takes place at a temperature of less than about 50° C. In some embodiments, oxidizing takes place at a temperature of less than about 30° C.

In general, reaction times may vary as a function of the reaction temperature and as a function of the particle size of the starting graphite source. In various embodiments, reaction times may vary from about 1 hour to about 200 hours. In other embodiments, reaction times may vary from about 1 hour to about 24 hours. In other embodiments, reaction times may vary from about 1 hour to about 12 hours. In still other embodiments, reaction times may vary from about 1 hour to about 6 hours.

At the aforesaid temperatures, a high recovery of graphene oxide having a flake dimension approximating that of the starting graphite flakes and only a small amount of mellitic acid and other low molecular weight byproducts are observed. Operation at these temperatures is advantageous to minimize decomposition of the oxidant, particularly when the oxidant is $KMnO_4$. In strongly acidic media, permanganate slowly decomposes to Mn(IV) species that are incapable of oxidizing graphite to graphene oxide. Hence, the temperature is kept as low as possible to provide for essentially complete conversion of graphite to graphene oxide at an acceptable rate using only a moderate excess of $KMnO_4$. In the theoretical limit of infinite size graphite crystals, for each gram of graphite being oxidized, 4.40 grams of $KMnO_4$ are required for stoichiometric equivalence. Losses of $KMnO_4$ to decomposition, formation of carboxylic acid groups and other basal plane edge functionality, and hole formation in the basal plane make the addition of oxidant somewhat above the theoretical amount desirable.

In some embodiments of the present disclosure, about 0.01 to about 10 grams of $KMnO_4$ per gram of graphite (0.002 to about 2.3 equiv. $KMnO_4$) may be used. In embodiments having sub-stoichiometric quantities of $KMnO_4$ or any other oxidant, a co-oxidant may also be included to re-oxidize the primary oxidant and make the reaction proceed to completion. Illustrative co-oxidants include, for example, oxygen and N-methylmorpholine N-oxide (NMO). In some embodiments of the present disclosure, about 6 grams of $KMnO_4$ per gram of graphite (1.4 equiv. $KMnO_4$) may be used to obtain graphene oxide having properties that are different than previously known forms of graphene oxide.

In other various embodiments, methods for forming graphene oxide include providing a graphite source, providing a solution containing at least one acid solvent, at least one oxidant and at least one protecting agent, mixing the graphite source with the solution, and oxidizing the graphite source with the at least one oxidant in the presence of the at least one protecting agent to form graphene oxide. The at least one protecting agent is operable for protecting vicinal diols.

In still other various embodiments, methods for forming graphene oxide include providing a graphite source, providing a solution containing at least one acid solvent, potassium permanganate and at least one protecting agent, mixing the graphite source with the solution, and oxidizing the graphite source with the potassium permanganate in the presence of the at least one protecting agent to form graphene oxide. The at least one acid solvent may be, for example, oleum, sulfuric acid, fluorosulfonic acid, trifluoromethanesulfonic acid, and combinations thereof. The at least one protecting agent may be, for example, trifluoroacetic acid; phosphoric acid; orthophosphoric acid; metaphosphoric acid; polyphosphoric acid; boric acid; trifluroacetic anhydride; phosphoric anhydride; orthophosphoric anhydride; metaphosphoric anhydride; polyphosphoric anhydride; boric anhydride; mixed anhydrides of trifluoroacetic acid, phosphoric acid, orthophosphoric acid, metaphosphoric acid, polyphosphoric acid, and boric acid; and combinations thereof.

In some embodiments, methods of the present disclosure further include isolating the graphene oxide. Isolating the graphene oxide may take place by, for example, centrifugation or filtration. In some embodiments, a poor solvent (e.g., ether) may be added to a solution of graphene oxide to induce precipitation. In some embodiments, the methods further include washing the graphene oxide after isolating the graphene oxide. For example, in some embodiments, the graphene oxide may be washed with solvents including hydrochloric acid, water, acetone, or alcohols to remove small molecule byproducts. In other embodiments, the graphene oxide may be washed with solutions of bases. Washing with solutions of bases such as, for example, sodium hydroxide, sodium carbonate or sodium bicarbonate afford the sodium salt of carboxylates or other acidic functional groups (e.g., hydroxyl groups) on the graphene oxide. Similarly, other basic salts of metal cations such as, for example, potassium, cesium, calcium, magnesium and barium can be used.

In some embodiments, the methods of the present disclosure may further include purifying the graphene oxide. However, in alternative embodiments, the graphene oxide may be used in an unpurified state. One of ordinary skill in the art will recognize that various applications for the graphene oxide product may require different levels of purity that might necessitate further purification. Illustrative impurities that may remain in unpurified graphene oxide include, for example, residual inorganic salts and low molecular weight organic compounds. Several illustrative applications of graphene oxide and chemically converted graphene are discussed in further detail hereinbelow. As a non-limiting example, electronics applications would likely be facilitated by using highly purified graphene oxide, whereas drilling fluid applications of graphene oxide might be feasible with unpurified graphene oxide. For example, neutralization of graphene oxide in a sulfuric acid/phosphoric acid reaction mixture with barium carbonate would provide precipitated barium sulfate and barium phosphate with the graphene oxide, along with smaller amounts of residual potassium and manganese salts, that may be utilized in a drilling fluid composition without further purification.

In some embodiments, methods of the present disclosure may further include reacting the graphene oxide with a derivatizing agent to form a functionalized graphene oxide. Such functionalized graphene oxides generally contain a plurality of functional groups attached to the graphene oxide through a covalent bond. Chemical bonding of the functional groups may occur to the edge of the graphene oxide, to the basal plane of the graphene oxide, or to both the edge and the basal plane of the graphene oxide. In various embodiments, functional groups present in the graphene oxide (e.g., carboxylic acids, hydroxyl groups, carbonyl groups, and epoxides) may be chemically transformed by the derivatizing agents in forming the functionalized graphene oxide.

In various embodiments, methods of the present disclosure further include reducing the graphene oxide with at least one reducing agent to form chemically converted graphene. As will be described hereinafter, chemically converted graphene produced according to the methods of the present disclosure is different than previously known chemically converted graphene in that it has a much higher electrical conductivity.

In some embodiments, the at least one reducing agent for forming chemically converted graphene from graphene oxide may be, for example, hydrazines, iodides, phosphines, phosphites, sulfides, sulfites, hydrosulfites, borohydrides, cyanoborohydrides, aluminum hydrides, boranes, hydroxylamine, diimine, dissolving metal reductions, hydrogen, and combinations thereof. In some embodiments, the at least one reducing agent may be hydrazine or hydrazine hydrate. In other embodiments, the at least one reducing agent may be hydrogen. In some embodiments, the graphene oxide may be first reduced with hydrazine or hydrazine hydrate and thereafter reduced with a second, more powerful reducing agent such as, for example, hydrogen. The second reduction may further restore the sp$^2$ structure of pristine graphene sheets over that obtained in the first reduction. In various embodiments, reduction of the graphene oxide with hydrogen may involve annealing the graphene oxide in the presence of hydrogen. In some embodiments, annealing may include an inert gas.

Hydrazine, for example, removes ketone and hydroxyl groups from graphene oxide but leaves behind edge carboxylic acid groups in the chemically converted graphene. The residual carboxylic acid groups may disrupt the π-conjugated network of the graphene sheet and lower the conductivity of the chemically converted graphene relative to that ultimately obtainable by their removal. Hydrogen may be more efficient than hydrazine at removing oxygen-containing functional groups from the graphene oxide, since this reagent removes even carboxylic acid groups in addition to carbonyl and hydroxyl functionalities. In some embodiments, borane ($BH_3$) may be used to reduce the graphene oxide. Borane is particularly effective at reducing carboxylic acids to alcohols, and the alcohols can be further removed with hydrogen and heat in a second reduction step.

In some embodiments, the methods further include reacting the chemically converted graphene with a derivatizing agent to form a functionalized, chemically converted graphene. IN some embodiments, the functionalized, chemically converted graphene is derivatized with a plurality of functional groups about its basal plane. In other embodiments, the functionalized, chemically converted graphene is derivatized with a plurality of functional groups on its edge. In some embodiments, the functional groups are covalently bound to the functionalized, chemically converted graphene by a carbon-carbon bond. In other embodiments, the functional groups are covalently bound to the functionalized, chemically converted graphene by a carbon-oxygen bond. In some embodiments of the present disclosure, the derivatizing agent is a diazonium species. In some embodiments, the derivatizing agent is an aryl diazonium species. In some embodiments, the diazonium species may be a pre-formed diazonium salt. In other embodiments, the diazonium species may be a diazonium salt that is formed in situ. A diazonium species may be formed in situ by, for example, treating an amine with an organic nitrite such as, for example, isoamyl nitrite.

In various embodiments of the present disclosure, mixtures containing graphene oxide; functionalized graphene oxide; chemically converted graphene; functionalized, chemically converted graphene and combinations thereof are operable to slow the filtration rate of a liquid mixture such as, for example, an aqueous liquid mixture, a non-aqueous liquid mixture, and combinations thereof. Slowing of the filtration rate is relative to a solution in which one of the aforesaid forms of graphene is not included. In some embodiments, at least two different particle size ranges of the graphene oxide; functionalized graphene oxide; chemically converted graphene; and functionalized, chemically-converted graphene may be used in the mixtures. Use of two different particle size ranges produces advantageous slowing of the filtration rate over that obtained from a single particle size range. Slowing of the filtration rate of liquid mixtures makes the graphene oxide; functionalized graphene oxide; chemically converted graphene; and functionalized, chemically converted graphene of the present disclosure good candidates for drilling fluid applications, as will be described in further detail hereinafter.

In some embodiments, graphene oxide of the present disclosure is operable to slow the filtration rate of a liquid mixture such as, for example, an aqueous liquid mixture, a non-aqueous liquid mixture and combinations thereof. In various embodiments, mixtures containing graphene oxide that are operable to slow the filtration rate of a liquid mixture such as, for example, an aqueous liquid mixture, a non-aqueous liquid mixture, or combinations thereof, are described herein. In some embodiments, the mixtures containing graphene oxide contain at least two different particle size ranges of graphene oxide.

In some embodiments, functionalized graphene oxide of the present disclosure is soluble in a substantially non-aqueous liquid medium such as, for example, oil or petroleum. In some embodiments, the functionalized graphene oxide is operable to slow the filtration rate of a substantially non-aqueous liquid mixture. In various embodiments, mixtures containing functionalized graphene oxide that are operable to slow the filtration rate of a liquid mixture such as, for example, an aqueous liquid mixture, a non-aqueous liquid mixture, or combinations thereof, are described herein. In some embodiments, the mixtures containing functionalized graphene oxide are operable to slow the filtration rate of a substantially non-aqueous liquid mixture. In some embodiments, the mixtures containing functionalized graphene oxide contain at least two different particle size ranges of functionalized graphene oxide.

In various embodiments, mixtures containing chemically converted graphene that are operable to slow the filtration rate of a liquid mixture such as, for example, an aqueous liquid mixture, a non-aqueous liquid mixture, or combinations thereof, are described herein. In some embodiments, the mixtures containing chemically converted graphene contain at least two different particle size ranges of chemically converted graphene.

In various embodiments, mixtures containing functionalized, chemically converted graphene that are operable to slow the filtration rate of a liquid mixture such as, for example, an aqueous liquid mixture, a non-aqueous liquid mixture, or combinations thereof, are described herein. In some embodiments, the mixtures containing functionalized, chemically converted graphene contain at least two different particle size ranges of chemically converted graphene.

There are many potential uses for the graphene oxide, functionalized graphene oxide, chemically converted graphene, and functionalized, chemically converted graphene compositions of the present disclosure. Illustrative uses of the present compositions include, for example, additives for composite materials, filters for removing particulates, filters for removing dissolved salts (ion-exchange filters), filters for removing dissolved organic compounds, membranes for gas separation, materials for gas sequestration, additives for elastomeric materials to prevent explosive decompression, additives for drilling fluids, production of films, wound care agents and drug delivery agents for compounds that are poorly soluble or insoluble in water. In addition, the chemically converted graphenes disclosed herein are conductive and may be used, for example, in electronic devices, conductive films, batteries, and supercapacitors.

The present graphene oxide compositions are believed to be particularly advantageous for applications relying on mechanical strength of the graphene oxide basal plane. The presence of holes or other defects in the graphene oxide basal plane may detrimentally impact the tensile strength or gas impermeability. Such defects are eliminated or significantly minimized in the present graphene oxide compositions. Furthermore, as demonstrated hereinbelow, the presence of holes or other defects in the graphene basal plane correlates with a reduced conductivity in chemically converted graphene following the reduction of graphene oxide. As demonstrated hereinbelow, the chemically converted graphene of the present disclosure displays a higher electrical conductivity due to its elimination or minimization of basal plane defects.

In wound care applications, the graphene oxide and chemically converted graphene compositions of the present disclosure may be grafted or bonded to at least one anti-microbial agent. Such grafted graphene oxide and chemically converted graphene oxide compositions may be included as part of a wound dressing to advantageously improve infection suppression, provide odor control and inhibit lipophilic toxins from entering the wound. For example, in a non-limiting embodiment, graphene oxide or chemically converted graphene that has been grafted or bonded to at least one anti-microbial agent may be added to ordinary gauze.

Water-soluble graphene oxide or chemically converted graphene compositions may be prepared by attaching a plurality of polymer chains or small molecules thereto. In some embodiments, the polymer chains or small molecules may be attached to functional groups present on the edge of the graphene oxide or chemically converted graphene (e.g., carboxylic acid groups, epoxides, hydroxyls and ketones). In other embodiments, the polymer chains or small molecules may be attached directly to the graphene basal plane or through functional groups present in the basal plane (e.g., vicinal diols). In still other embodiments, the polymer chains or small molecules may be attached to the basal plane through functional groups introduced in functionalized, chemically converted graphenes. Suitable polymers for conferring water solubility may include, for example, polyethylene glycol (PEG), polypropylene glycol, polyethylene imine (PEI), PEG-PEI block copolymers, polyvinyl pyrrolidone (PVP), polyvinyl alcohol (PVA), polyacrylic acid, starch, pectin, agarose, and other polysaccharides. Suitable small molecules for conferring water solubility include, for example, 2-aminoethanesulfonic acid.

In some embodiments, residual carboxylic acid groups in graphene oxide, chemically converted graphene or functionalized, chemically converted graphene may be esterified. In some embodiments, the graphene oxide, chemically converted graphene or functionalized, chemically converted graphene may be esterified with small alcohols having less than about 4 carbons. Esterified graphene oxide or esterified chemically converted graphene may have a significantly different solubility than does the non-esterified graphene oxide or non-esterified chemically converted graphene. For example, graphene oxide esterified with a plurality of methyl or ethyl esters displays solubility in water similar to that of non-esterified graphene oxide. However, the esterified graphene oxide advantageously does not precipitate in the presence of certain inorganic cations such as, for example, $Mg^{2+}$ and $Ca^{2+}$. Such esterified graphene oxides may be particularly advantageous for inclusion in drilling fluid applications for this reason, as described hereinbelow.

Other molecules may be advantageously used to modify the solubility of the graphene oxide and chemically converted graphene compositions to alter their ion affinity and improve their biocompatibility, for example. By way of non-limiting example, targeting moieties such as, for example, folate, estrogens, epidermal growth factor (EGF) and aptamers may be attached to graphene oxide and chemically converted graphene to improve interaction with appropriate cellular receptors.

Chemical modification of the graphene oxide and chemically converted graphene can also make these compositions suitable for selective binding to cells expressing target receptors from diverse cellular dispersions or other biological fluids. Such modified graphene oxide and chemically converted graphene compositions may be fabricated into selective cellular filters or active elements of cellular and chemical sensors. For example, graphene oxide or chemically converted graphene functionalized with antibodies to influenza virus (or any other pathogen) and connecting two conductive leads (i.e., electrode terminals) will change impedance upon antigen binding. The resulting change in electrical properties enables the use of the functionalized graphene oxide and functionalized, chemically converted graphenes in sensors for diagnostic testing of biological fluids.

Water-soluble graphene oxide and chemically converted graphene compositions such as those described above may be exploited for sequestration of water-insoluble drugs for drug delivery applications. For example, in an embodiment, paclitaxel may be incorporated in a water-based formulation using water soluble graphene oxide or chemically converted graphene containing a plurality of polymer chains. Sequestration of paclitaxel and other drugs within the polymer chains of related carbon nanotube compositions have been described in commonly-assigned PCT publications WO 2008/18960 and WO 2009/070380, each of which are incorporated herein by reference. The amount of the water-soluble graphene oxide or chemically converted graphene sufficient to provide acceptable solubility of paclitaxel or other drugs may be dramatically lower than surfactants typically used for the same purpose. Therefore, advantageous toxicity improvement is possible using the water-soluble graphene oxide or chemically converted graphene compositions as a drug delivery vehicle Drilling fluids including graphenes are described in commonly-assigned PCT publication WO 2009/089391, which is incorporated by reference herein in its entirety. In some embodiments, graphene oxide of the present disclosure is operable for slowing the filtration rate of an aqueous solution. As referenced hereinabove, in some embodiments of the present disclosure, the graphene oxide disclosed herein may be used in drilling fluid compositions to provide for improved downhole production. In other embodiments, chemically converted graphene or functionalized, chemically converted graphenes may be used in drilling fluid compositions. In some embodiments, esterified graphene oxide or esterified chemically converted graphene may be used in drilling fluid compositions. In some embodiments, the graphene oxide or chemically converted graphene used in the drilling fluid compositions may be left in an unpurified state for inclusion in a drilling fluid composition. In a non-limiting embodiment, the graphene oxide of the present disclosure may be neutralized with barium carbonate, resulting in precipitation of barium sulfate (barite) and barium phosphate, each of which are sufficiently environmentally benign to be used in downhole operations.

EXPERIMENTAL EXAMPLES

The following examples are provided to more fully illustrate some of the embodiments disclosed hereinabove. It should be appreciated by those of ordinary skill in the art that the methods disclosed in the examples that follow represent techniques that constitute illustrative modes for practice of the disclosure. Those of ordinary skill in the art should, in light of the present disclosure, appreciate that many changes can be made in the specific embodiments that are disclosed and still obtain a like or similar result without departing from the spirit and scope of the disclosure.

Example 1

Synthesis of Graphene Oxide in the Presence of a Protecting Agent (Highly-Oxidized Graphene Oxide)

A 9:1 mixture of conc. $H_2SO_4$:$H_3PO_4$ (360:40 mL) was added to a mixture of graphite flakes (3.0 g, 1 wt. equiv) and $KMnO_4$ (18.0 g, 6 wt. equiv), producing a slight exotherm to 35-40° C. The reaction was then heated to 50° C. and stirred for 12 h. The reaction was cooled to RT and poured on to ice (~400 mL) along with 30% $H_2O_2$ (3 mL). For work up, the mixture was sifted through a metal U.S. Standard testing sieve (W. S Tyler, 300 µm) and then filtered through polyester fiber (Carpenter Co.). The filtrate was centrifuged (4000 rpm for 4 h), and the supernatant was decanted away. The remaining solid material was then washed in succession with 200 mL of water, 200 mL of 30% HCl, and twice with 200 mL of ethanol. For each wash the mixture was sifted through the U.S. Standard testing sieve and then filtered through polyester fiber. In each case, the filtrate was centrifuged (4000 rpm for 4 h), and the supernatant was decanted away. The material remaining after the multiple-wash process was coagulated with 200 mL of ether, and the resulting suspension was filtered over a PTFE membrane with a 0.45 µm pore size. The solid obtained on the filter was vacuum dried overnight at room temperature. The yield was 5.8 g of a solid having a color similar to that of peanut butter.

The yield of hydrophobic, under-oxidized graphite oxide removed during the first passage through the U.S. Standard testing sieve was 0.7 g. Visual observation of the hydrophobic, under-oxidized graphite oxide showed the amount of recovered solid was significantly less than that obtained by Hummers' Method (Reference Example 1) or a modification of Hummers' Method (Reference Example 2).

Reference Example 1

Synthesis of Graphene Oxide via Hummers' Method (Hummers' Graphene Oxide)

Concentrated $H_2SO_4$ (69 mL) was added to a mixture of graphite flakes (3.0 g, 1 wt. equiv) and $NaNO_3$ (1.5 g, 0.5 wt equiv), and the mixture was cooled to 0° C. $KMnO_4$ (9.0 g, 3 wt. equiv) was added slowly in portions to keep the reaction temperature below 20° C. The reaction was warmed to 35° C. and stirred for 30 min, at which time water (138 mL) was added slowly, producing a large exotherm to 98° C. External heating was introduced to maintain the reaction temperature at 98° C. for 15 min, and the reaction was cooled using a water bath for 10 min. Additional water (420 mL) and 30% $H_2O_2$ (3 mL) were then added, producing another exotherm. After air cooling, the mixture was purified as described for Example 1. The yield was 1.2 g of a black solid. The yield of hydrophobic, under-oxidized graphite oxide removed during the first passage through the U.S. Standard testing sieve was 6.7 g.

Reference Example 2

Synthesis of Graphene Oxide via a Modification of Hummers' Method (Modified Hummers' Graphene Oxide)

Graphene oxide was also synthesized by a modification of Hummers' Method (see Reference Example 1) by including additional $KMnO_4$ in the reaction mixture. Concentrated $H_2SO_4$ (69 mL) was added to a mixture of graphite flakes (3.0 g, 1 wt. equiv) and $NaNO_3$ (1.5 g, 0.5 wt. equiv), and the mixture was cooled using an ice bath to 0° C. $KMnO_4$ (9.0 g, 3 wt. equiv) was added slowly in portions to keep the reaction temperature below 20° C. The reaction was warmed to 35° C. and stirred for 7 h. Additional $KMnO_4$ (9.0 g, 3 wt. equiv) was added in one portion, and the reaction was stirred for 12 h at 35° C. The reaction mixture was cooled to room temperature and poured on to ice (~400 mL) along with 30% $11_2O_2$ (3 mL). The mixture was then purified as described for Example 1. The yield was 4.2 g of a black solid. The yield of hydrophobic, under-oxidized graphite oxide removed during the first passage through the U.S. Standard testing sieve was 3.9 g.

Example 2

Characterization of Highly-Oxidized Graphene Oxide Produced in the Presence of a Protecting Agent Compared to Graphene Oxide Produced by Hummers' Method or Modified Hummers' Method Physical characterization of the graphene oxide produced in the presence of a protecting agent (highly-oxidized graphene oxide) was similar in some respects to graphene oxide produced by Hummers' Method or a modification of Hummers' Method (Hummers' graphene oxide and modified Hummers' graphene oxide, respectively). However, further spectroscopic characterization of the highly-oxidized graphene oxide revealed several significant differences indicating that the highly-oxidized graphene oxide is a composition distinct from previously known graphene oxide materials. Further evidence to this effect is also demonstrated upon reduction of the highly-oxidized graphene oxide to chemically converted graphene, as discussed in more detail in Examples 3 and 4, in view of the latter material's significantly enhanced electrical conductivity.

Raman Spectroscopy, Infrared Spectroscopy and Atomic Force Microscopy: Raman spectroscopy, FTIR-ATR spectroscopy and atomic force microscopy showed no significant differences between highly-oxidized graphene oxide, Hummers' graphene oxide, and modified Hummers' graphene oxide.

Figures 2A, 2B, 2C:
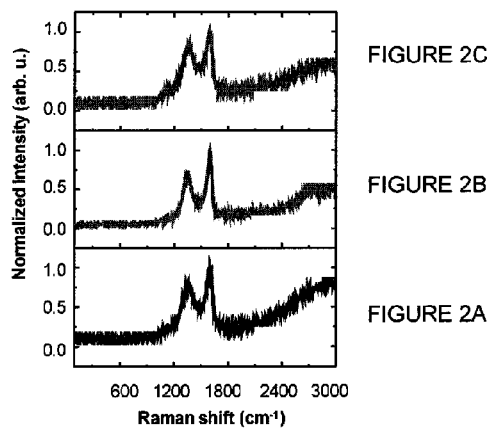
FIGS. 2A-2C show illustrative Raman spectra for highly-oxidized graphene oxide (FIG. 2A), Hummers' graphene oxide (FIG. 2B) and modified Hummers' graphene oxide (FIG. 2C)

FIGS. 2A-2C show illustrative Raman spectra for highly-oxidized graphene oxide (FIG. 2A), Hummers' graphene oxide (FIG. 2B) and modified Hummers' graphene oxide (FIG. 2C). FIGS. 2A-2C were very similar to one another, having D peaks at ~1590 cm$^{-1}$ and G peaks at ~1350 cm$^{-1}$, confirming a lattice distortion in the graphene oxide. The Raman spectra were recorded using a 514 nm laser excitation.

Figures 3A, 3B, 3C:
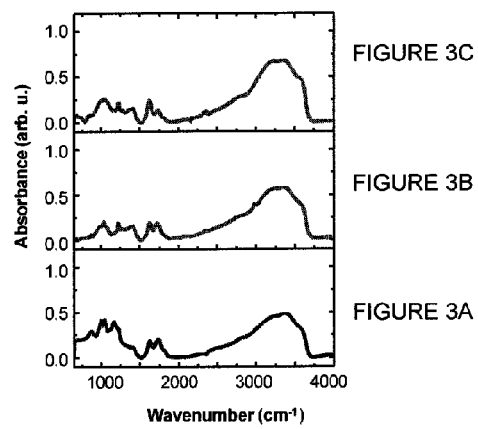
FIGS. 3A-3C show illustrative FTIR-ATR spectra for highly-oxidized graphene oxide (FIG. 3A), Hummers' graphene oxide (FIG. 3B) and modified Hummers' graphene oxide (FIG. 3C)

FIGS. 3A-3C show illustrative FTIR-ATR spectra for highly-oxidized graphene oxide (FIG. 3A), Hummers' graphene oxide (FIG. 3B) and modified Hummers' graphene oxide (FIG. 3C). Like the Raman spectra, FTIR-ATR spectra of the various graphene oxides were very similar to one another, having O—H stretching vibrations (3420 cm$^{-1}$), C═O stretching vibration (1720-1740 cm$^{-1}$), C═C from unoxidized sp$^2$ C—C bonds (1590-1620 cm$^{-1}$) and C—O vibrations (1250 cm$^{-1}$).

FIGS. 4A-4C show illustrative tapping mode AFM topographic images for highly-oxidized graphene oxide (FIG. 4A), Hummers' graphene oxide (FIG. 4B) and modified Hummers' graphene oxide (FIG. 4C). FIGS. 4D-4F show corresponding illustrative AFM height profiles for highly-oxidized graphene oxide (FIG. 4D), Hummers' graphene oxide (FIG. 4E) and modified Hummers' graphene oxide (FIG. 4F). As indicated by the height of 1.1 nm measured in all of the AFM height profiles, the various graphene oxides consisted of essentially monolayer graphene.

Thermogravimetric Analysis: FIG. 5 shows illustrative thermogravimetric analyses (TGA) for highly-oxidized graphene oxide, Hummers' graphene oxide, and modified Hummers' graphene oxide. As indicated in the TGA analyses, each graphene oxide showed a major weight loss between 150-300° C., corresponding to CO, $CO_2$ and steam release from the most labile functional groups. Between 400-950° C., a slower mass loss was observed due to decomposition of more stable oxygen-containing functionalities. Hummers' graphene oxide displayed the smallest weight loss by TGA. Highly-oxidized graphene oxide and modified Hummers' graphene oxide had comparable weight losses. The higher weight loss of highly-oxidized graphene oxide compared to Hummers' graphene oxide is consistent with a higher degree of oxidation in the highly-oxidized graphene oxide of the present disclosure.

Figures 6A, 6B, 6C:
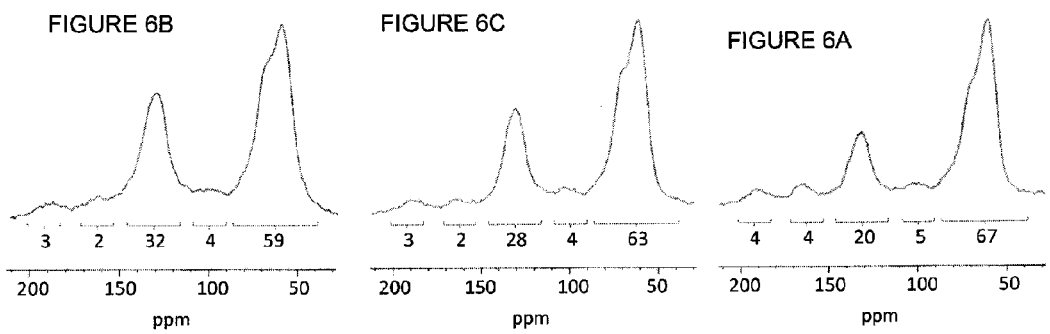
FIGS. 6A-6C show illustrative solid state $^{13}C$ NMR spectra for highly-oxidized graphene oxide (FIG. 6A), Hummers' graphene oxide (FIG. 6B) and modified Hummers' graphene oxide (FIG. 6C)

Solid State $^{13}$C NMR: FIGS. 6A-6C show illustrative solid state $^{13}$C NMR spectra for highly-oxidized graphene oxide (FIG. 6A), Hummers' graphene oxide (FIG. 6B) and modified Hummers' graphene oxide (FIG. 6C). The $^{13}$C NMR spectra were obtained at 50.3 MHz, with 12 kHz magic angle spinning, a 90° $^{13}$C pulse, 41 ms FID and 20 second relaxation delay. In the $^{13}$C NMR spectra, signals near 190 ppm were assigned to carboxylates, signals near 164 ppm were collectively assigned to ketone, ester and lactol carbonyl groups, signals near 131 ppm were assigned to graphitic sp$^2$ carbons and signals near 101 ppm were assigned to sp$^3$ carbons of lactols. The signals near 70 ppm were assigned to alcohols, and the upfield shoulder of this peak was assigned to epoxides. Integral ratios are shown underneath each peak in the $^{13}$C NMR spectra of FIGS. 6A-6C and summarized in Table 1 below. Table 1 also contains calculated integral ratios for alcohol/epoxide:sp$^2$ graphitic carbon and total oxygen-containing functionality: sp$^2$ graphitic carbon as a measure of the degree of oxidation.

TABLE 1

|  | sp$^2$ Graphitic Carbon | Alcohol/ Epoxide | Carboxylate | Carbonyl | Lactol sp$^3$ | Alcohol/ Epoxide: Graphitic sp$^2$ Ratio | Total Oxygen Functionality: Graphitic sp$^2$ Ratio |
|---|---|---|---|---|---|---|---|
| Highly-oxidized graphene oxide | 20 | 67 | 4 | 4 | 5 | 3.4:1 | 4.0:1 |
| Hummers' Graphene Oxide | 32 | 59 | 3 | 2 | 4 | 1.8:1 | 2.1:1 |
| Modified Hummers' Graphene Oxide | 28 | 63 | 3 | 2 | 4 | 2.3:1 | 2.6:1 |

Solid state $^{13}$C NMR also indicated that the highly-oxidized graphene oxide was more completely oxidized than either Hummers' graphene oxide or modified Hummers' graphene oxide. The simplest measure of the degree of oxidation is the ratio of the alcohol/epoxide peak integration to that of the graphitic sp$^2$ carbons. A pristine graphene plane having no edge functionalization would have a ratio of zero, since all carbons would be of the sp$^2$ type. Upon oxidation to form graphene oxide, the number of sp$^2$ carbons in the graphene plane decreases and oxygen-containing functionalities correspondingly increase to produce a non-zero ratio. Higher ratios are therefore indicative of a greater degree of oxidation. As shown in Table 1, the highly-oxidized graphene oxide was more oxidized than either Hummers' graphene oxide or modified Hummers' graphene oxide, as evidenced by its greater alcohol/epoxide:graphitic sp$^2$ carbon ratio and total oxygen functionality:graphitic sp$^2$ carbon ratio. There was also a relatively higher incidence of epoxide moieties in the highly-oxidized graphene oxide relative to either Hummers' graphene oxide or modified Hummers' graphene oxide, as evidenced by the greater intensity of the shoulder in the $^{13}$C NMR spectrum for highly-oxidized graphene oxide (FIG. 6A).

Figure 7:
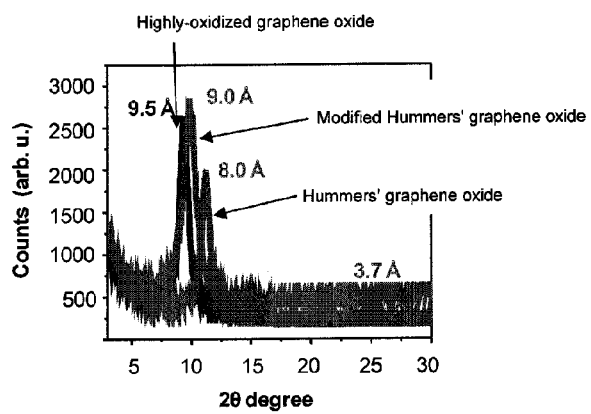
FIG. 7 shows illustrative XRD spectra for highly-oxidized graphene oxide, Hummers' graphene oxide and modified Hummers' graphene oxide.

X-Ray Diffraction Spectra: FIG. 7 shows illustrative XRD spectra for highly-oxidized graphene oxide, Hummers' graphene oxide and modified Hummers' graphene oxide. The XRD spectra also support the overall conclusion that the highly-oxidized graphene oxide of the present disclosure is more oxidized than either Hummers' graphene oxide or modified Hummers' graphene oxide. For XRD, the interlayer spacing is proportional to the degree of oxidation. In the XRD spectra of FIG. 7, the interlayer spacings were 9.5 Å, 9.0 Å and 8.0 Å, respectively, for highly-oxidized graphene oxide, modified Hummers' graphene oxide and Hummers' graphene oxide, indicating a higher degree of oxidation in the highly-oxidized graphene oxide. The XRD spectrum for Hummers' graphene oxide also contained a small peak at 3.7 Å, indicative of a trace of graphite flake starting material remaining in the final product.

X-Ray Photoelectron Spectroscopy: FIG. 8 shows illustrative deconvoluted XPS spectra for highly-oxidized graphene oxide, Hummers' graphene oxide and modified Hummers' graphene oxide normalized with respect to the C1s graphitic $sp^2$ peak. The XPS spectra also support the overall conclusion that the highly-oxidized graphene oxide of the present disclosure is more oxidized than either Hummers' graphene oxide or modified Hummers' graphene oxide. The XPS spectra also support an overall conclusion that the highly-oxidized graphene oxide has a more organized structure than either of the other two materials. The C1s XPS spectra of the various graphene oxide samples were deconvoluted into four peaks corresponding to the following functional groups: graphitic $sp^2$ carbons (C=C, 284.8 eV), epoxy/hydroxyls (C—O, 286.2 eV), carbonyl (C=O, 287.8 eV) and carboxylates (O—C=O, 289.0 eV). Deconvolution was accomplished using Multipack software, version 7.0. After deconvolution, the C1s XPS spectra were normalized relative to the graphitic $sp^2$ carbon peak. The latter three types of carbon, corresponding to oxidized material, were combined and their intensity determined relative to the graphitic $sp^2$ carbon peak. As determined from FIG. 8, highly-oxidized graphene oxide had 69% oxidized carbon and 31% graphitic $sp^2$ carbon. In contrast, Hummers' graphene oxide had only 61% oxidized carbon and 39% graphitic $sp^2$ carbon, and modified Hummers' graphene oxide had 63% oxidized carbon and 37% graphitic $sp^2$ carbon, Furthermore, compared to the other two XPS spectra, the deconvoluted C 1 s XPS spectra for highly-oxidized graphene oxide was considerably sharper, thus indicating that for a comparable level of oxidation, the highly-oxidized graphene oxide had a more regular structure with less overall variance in functionality compared to the other two graphene oxide materials.

Selected Area Electron Diffraction and Transmission Electron Microscopy: FIGS. 9A-9C show illustrative SAED patterns for highly-oxidized graphene oxide (FIG. 9A), Hummers' graphene oxide (FIG. 9B) and modified Hummers' graphene oxide (FIG. 9C). The SAED pattern for Hummers' graphene oxide indicated moderate crystallinity, but in the more highly oxidized modified Hummers' graphene oxide, a more diffuse diffraction pattern was observed, which is indicative of a more amorphous structure. In contrast, the SAED pattern for highly-oxidized graphene oxide prepared by the methods of the present disclosure had the sharpest diffraction pattern of all three samples, indicating the highest crystallinity and a more regular carbon framework. FIGS. 10A-10C show illustrative TEM images for highly-oxidized graphene oxide (FIG. 10A), Hummers' graphene oxide (FIG. 10B) and modified Hummers' graphene oxide (FIG. 10C) obtained on a laceycarbon grid.

Figure 11:
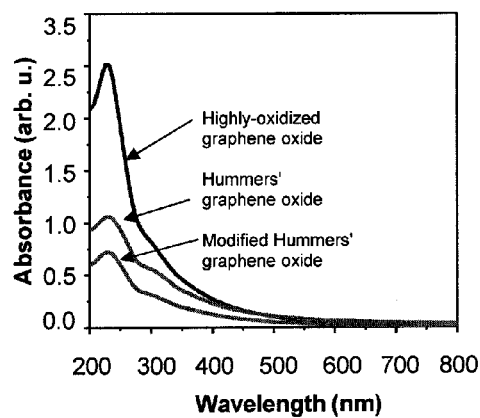
FIG. 11 shows illustrative UV/VIS spectra for highly-oxidized graphene oxide, Hummers' graphene oxide and modified Hummers' graphene oxide.

UV/VIS Spectroscopy: FIG. 11 shows illustrative UV/VIS spectra for highly-oxidized graphene oxide, Hummers' graphene oxide and modified Hummers' graphene oxide. UV/VIS spectra recorded at equal concentrations (0.05 mg/mL) for each of the three graphene oxide materials again suggested a more ordered structure having greater retention of aryl rings in the graphene basal plane for the highly-oxidized graphene oxide compared to either Hummers' graphene oxide or modified Hummers' graphene oxide. All three graphene oxide materials had $\lambda_{max}$ values in the 227-231 nm range, resulting from π-π* transitions of the aryl rings. Additionally, a shoulder at ~300 nm resulting from n-π* transitions of carbonyl groups was also observed in all three graphene oxide materials.

Although the $\lambda_{max}$ values indicated a grossly similar structure, the extinction coefficient of the highly-oxidized graphene oxide compared to the other graphene oxide materials was more indicative of a structure having a greater retention of aromatic rings and aromatic domains As shown in FIG. 11, equal concentrations of highly-oxidized graphene oxide, Hummers' graphene oxide and modified Hummers' graphene oxide produced a significantly higher absorbance for highly-oxidized graphene oxide compared to the other two graphene oxide materials. The similar $\lambda_{max}$ for the three graphene oxide materials indicates a comparable degree of extended conjugation in each material, but the overall absorption intensity indicates a much greater retention of aromatic rings in the highly-oxidized graphene oxide of the present disclosure.

Example 3

Reduction of Graphene Oxide to Form Chemically Converted Graphene

Reduction of each graphene oxide material was conducted similarly using hydrazine hydrate. In some cases, hydrazine hydrate reduction was followed by annealing at 300° C. in $H_2$. In general, hydrazine hydrate reduction was conducted by dispersing 100 mg of the graphene oxide material in 100 mL of deionized water and stirring for 30 minutes. Thereafter, 1.00 mL of hydrazine hydrate was added. The mixture was then heated for 45 minutes at 95° C. using a water bath. A black solid precipitated from the reaction mixture. The product was isolated by filtration on a 20 μm PTFE filter and was washed thereafter three times each with deionized water and methanol. Highly-oxidized graphene oxide formed 54 mg of chemically converted graphene when reduced with hydrazine hydrate. In contrast, modified Hummers' graphene oxide formed 57 mg of chemically converted graphene, and Hummers' graphene oxide formed 76 mg of chemically converted graphene.

Example 4

XPS Characterization of Chemically Converted Graphene

Figure 12:
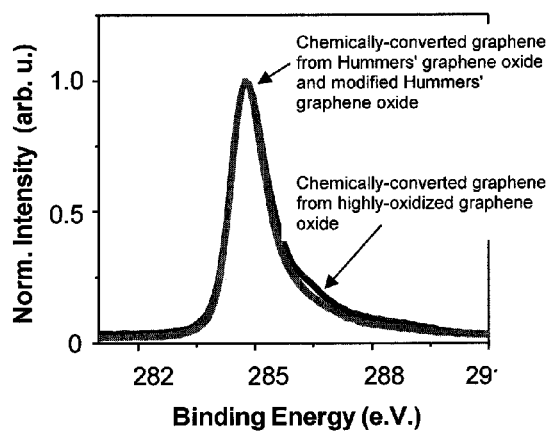
FIG. 12 shows illustrative C1s XPS spectra for chemically converted graphene produced from hydrazine hydrate reduction of highly-oxidized graphene oxide, Hummers' graphene oxide and modified Hummers' graphene oxide.

FIG. 12 shows illustrative C1s XPS spectra for chemically converted graphenes produced by hydrazine hydrate reduction of highly-oxidized graphene oxide, Hummers' graphene oxide and modified Hummers' graphene oxide. All three chemically converted graphenes displayed substantially identical C1s XPS spectra after hydrazine hydrate reduction, and the XPS spectra were essentially unchanged by annealing in Ar/$H_2$.

Example 5

Electrical Property Measurements of Chemically Converted Graphene

In contrast to the C1s XPS spectra, electrical conductivity of the chemically converted graphene prepared from highly-oxidized graphene oxide was significantly greater than that prepared from Hummers' graphene oxide or modified Hummers' graphene oxide. For fabrication of electrical devices for electrical conductivity measurements, reduction of each graphene oxide was conducted on a Si/SiO$_2$ substrate with hydrazine vapor. Briefly, the hydrazine vapor reduction was conducted as follows: Si/SiO$_2$ substrates were coated with graphene oxide and placed on a ½"-thick platform sitting on the bottom of a beaker containing 0.5 mL of hydrazine hydrate. The beaker was then covered with foil and heated for 45 minutes at 95° C. using a water bath. Typical thicknesses of the chemically converted graphene produced on the surface were less than 2 nm thick, consisting of 2 to 3 graphene layers. For the electrical property measurements, chemically converted graphenes were prepared from highly-oxidized graphene oxide, Hummers' graphene oxide and modified Hummers' graphene oxide, all in the same beaker so that each sample was exposed to identical reduction conditions.

Figure 13:
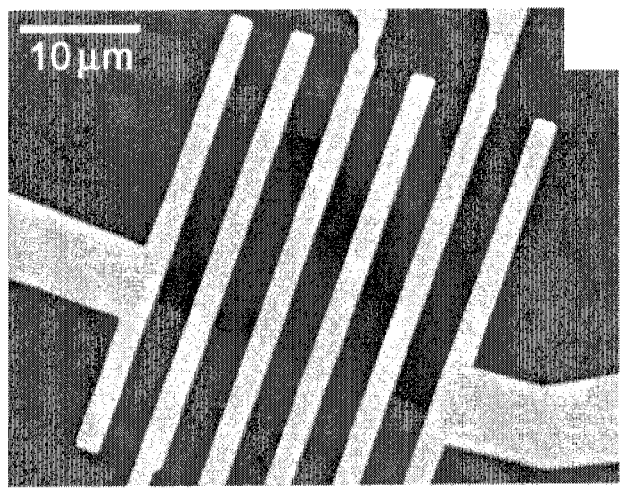
FIG. 13 shows a representative SEM image of an illustrative electronic device containing a chemically converted graphene used for electrical property measurements.

FIG. 13 shows a representative SEM image of an illustrative electronic device containing a chemically converted graphene used for electrical property measurements. Electronic devices were patterned by standard electron beam lithography using PMAA as a positive resist. 20 nm thick Pt contacts were then formed by electron beam evaporation and lift-off.

Figure 14:
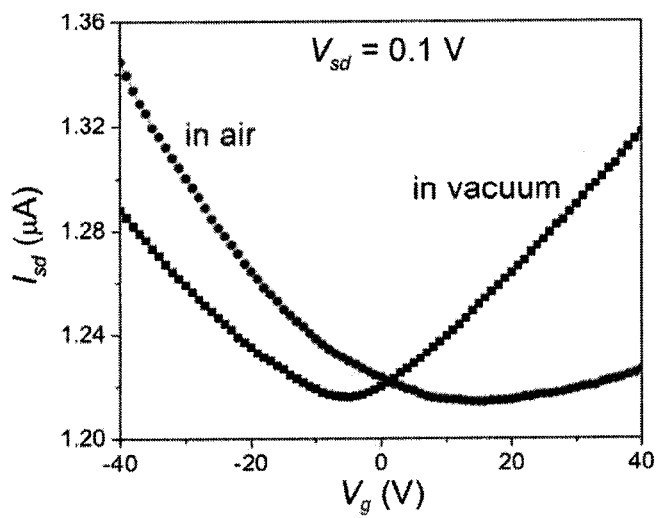
FIG. 14 shows illustrative source/drain current versus gate voltage plots in air and in vacuum for chemically converted graphene prepared from highly-oxidized graphene oxide.

Electrical property measurements were performed using a probe station (Desert Cryogenics TT-probe 6 system) in air or under vacuum with chamber base pressure below $10^{-5}$ torr. Typically, the electronic devices were kept under vacuum for at least 2 d before measurements were conducted. FIG. 14 shows illustrative source/drain current versus gate voltage plots in air and in vacuum for chemically converted graphene oxide prepared from highly-oxidized graphene oxide. When measured in air, the chemically converted graphene behaved as a p-type semiconductor. However, ambipolar electric field effects were observed under vacuum. The ambipolar electric field effect observed under vacuum can be attributed to desorption of the atmospheric adsorbates that are known to cause doping effects in graphene. The ambipolar field effect observed under vacuum was completely reversible, as re-exposure to air again produced p-type semiconductor behavior.

Most importantly, significantly different electrical conductivities were observed for chemically converted graphene prepared from highly-oxidized graphene oxide compared to that prepared from Hummers' graphene oxide or modified Hummers' graphene oxide. For a monolayer of chemically converted graphene prepared from Hummers' graphene oxide or modified Hummers' graphene oxide, conductivity values of ~0.05 S/cm were observed. In contrast, the measured conductivity for chemically converted graphene prepared from highly-oxidized graphene oxide was nearly twice as conductive at ~0.1 S/cm. The referenced conductivity values were averaged values for 3-5 electrical devices. It should be noted that these values do not represent maximum electrical conductivities, as annealing in Ar/H$_2$ could have been used to further improve the conductivities of the chemically converted graphenes. In summary, the electrical conductivity data highlights the fact that the highly-oxidized graphene oxide of the present disclosure and the chemically converted graphene prepared therefrom represent compositions that are unique from those prepared by prior methods (e.g., Hummers' method).

Example 6

Filtration Rates from Graphene Oxide Solutions

Filtrate flow rates were determined for graphene oxide solutions in order to determine their potential efficacy in drilling fluid applications. Graphene oxide was prepared as described in Example 1 using two sources of graphite: KW-9 (large graphite chips) and Al graphite (<20 μm graphite powder). Graphene oxide solutions were prepared at a concentration of either 2 g/L or 4 g/L in deionized water in the presence of 2.14 g/L DUO-VIS viscosifier (a xanthan gum high-molecular-weight biopolymer used for increasing viscosity in water-based systems, available from MI-S WACO). Dispersion of the graphene oxide was accomplished by mechanical dispersion in deionized water at 10,000 rpm for 10 minutes. Thereafter, the samples were cooled to room temperature and filtered as described below.

Figure 15:
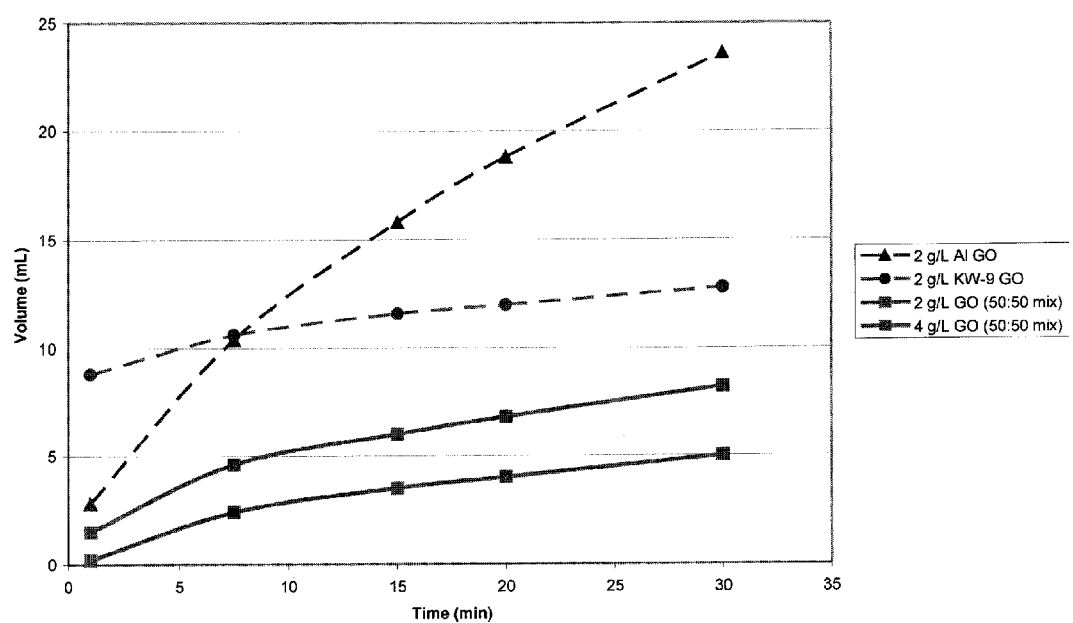
FIGS. 15 and 16 show illustrative plots of filtration volume as a function of time for various graphene oxide solutions.
Figure 16:
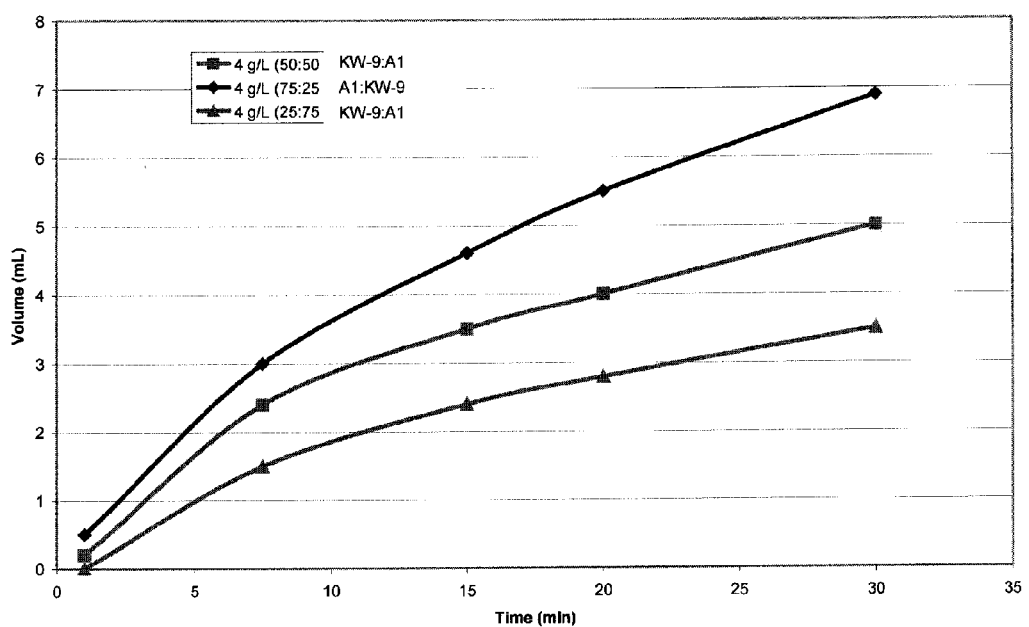

For each graphene oxide solution, 100 mL of the graphene oxide solution was placed in a pressure filtration apparatus and 100 psi pressure was applied with argon gas. The filter paper was Whatman grade 50 with a 90 mm diameter and 2.7 μm pore size. FIGS. 15 and 16 show illustrative plots of filtration volume as a function of time for various graphene oxide solutions. As shown in FIG. 15, a 1:1 mixture of KW-9 and Al graphene oxides produced superior filtration results compared to either of the two graphene oxide solutions alone. At a concentration of 4 g/L, a 1:1 mixture of KW-9 and Al graphene oxides produced just 5 mL of filtrate over the course of 30 minutes of filtration. Further optimization of the mixture of KW-9 graphene oxide and Al graphene oxide showed a 3:1 mixture of KW-9 graphene oxide:Al graphene oxide produced superior filtration results, as shown in FIG. 16. Under the present test conditions, filtration volumes less than about 7 mL are considered to be good materials for inclusion in drilling fluid compositions. Tables 2 and 3 summarize the filtration data for various graphene oxide solutions.

TABLE 2

| | Volume | | | |
|---|---|---|---|---|
| Time | 2 g/L Al graphene oxide | 2 g/L KW-9 graphene oxide | 2 g/L 1:1 KW-9:Al graphene oxide | 4 g/L 1:1 KW-9:Al graphene oxide |
| 1.0 | 2.8 | 8.8 | 1.5 | 0.2 |
| 7.5 | 10.4 | 10.6 | 4.6 | 2.4 |
| 15 | 15.8 | 11.6 | 6.0 | 3.5 |
| 20 | 18.8 | 12.0 | 6.8 | 4.0 |
| 30 | 23.6 | 12.8 | 8.2 | 5.0 |

TABLE 3

| | Volume | | |
|---|---|---|---|
| Time | 4 g/L 1:1 KW-9:Al graphene oxide | 4 g/L 1:3 KW-9:Al graphene oxide | 4 g/L 3:1 KW-9:Al graphene oxide |
| 1.0 | 0.2 | 0.5 | 0.0 |
| 7.5 | 2.4 | 3.0 | 1.5 |
| 15 | 3.5 | 4.6 | 2.4 |
| 20 | 4.0 | 5.5 | 2.8 |
| 30 | 5.0 | 6.9 | 3.5 |

From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is the following:

1. A method comprising:
   providing a graphite source;
   providing a solution comprising at least one oxidant and at least one protecting agent, wherein the at least one protecting agent is selected from the group consisting of trifluoroacetic acid, boric acid, trifluroacetic anhydride, boric anhydride, and combinations thereof; and wherein the at least one protecting agent is operable for protecting vicinal diols;
   mixing the graphite source with the solution, wherein the mixing comprises stirring the graphite source with the solution; and
   wherein the stirring results in the oxidizing of the graphite source with the at least one oxidant in the presence of the at least one protecting agent to form graphene oxide, wherein the at least one protecting agent protects vicinal diols during the stirring.

2. The method of claim 1, wherein the at least one oxidant is selected from the group consisting of permanganate, ferrate, osmate, ruthenate, chlorate, chlorite, nitrate, osmium tetroxide, ruthenium tetroxide, lead dioxide, and combinations thereof.

3. The method of claim 1, wherein the at least one oxidant comprises potassium permanganate.

4. The method of claim 1, wherein the solution further comprises at least one acid solvent.

5. The method of claim 4, wherein the at least one acid solvent is selected from the group consisting of oleum, sulfuric acid, chlorosulfonic acid, fluorosulfonic acid, trifluoromethanesulfonic acid, and combinations thereof.

6. The method of claim 4, wherein the at least one acid solvent comprises sulfuric acid.

7. The method of claim 1, wherein the at least one protecting agent chelates the vicinal diols.

8. The method of claim 1, wherein the at least one protecting agent protects each alcohol of the vicinal diols individually.

9. A method comprising:
   providing a graphite source;
   providing a solution comprising at least one acid solvent, at least one oxidant and at least one protecting agent;
   wherein the at least one protecting agent is selected from the group consisting of trifluoroacetic acid, boric acid, trifluroacetic anhydride, boric anhydride, and combinations thereof; and wherein the at least one protecting agent is operable for protecting vicinal diols; and
   mixing the graphite source with the solution, wherein the mixing comprises stirring the graphite source with the solution; and wherein the stirring results in the oxidizing of the graphite source with the at least one oxidant in the presence of the at least one protecting agent to form graphene oxide, wherein the at least one protecting agent protects vicinal diols during the stirring.

10. The method of claim 9, wherein the graphene oxide is more oxidized than graphene oxide prepared in the absence of the at least one protecting agent.

11. The method of claim 9, wherein the at least one acid solvent is selected from the group consisting of oleum, sulfuric acid, chlorosulfonic acid, fluorosulfonic acid, trifluoromethanesulfonic acid, and combinations thereof.

12. The method of claim 9, wherein the at least one acid solvent comprises sulfuric acid.

13. The method of claim 9, wherein the at least one oxidant comprises potassium permanganate.

14. The method of claim 9, wherein oxidizing the graphite source takes place at a temperature between about 30° C. and about 85° C.

15. The method of claim 9, further comprising:
   isolating the graphene oxide.

16. The method of claim 15, further comprising:
   reacting the graphene oxide with a derivatizing agent to form a functionalized graphene oxide.

17. The method of claim 15, further comprising:
   esterifying the graphene oxide to form an esterified graphene oxide.

18. The method of claim 15, further comprising:
   reducing the graphene oxide with at least one reducing agent to form chemically converted graphene.

19. The method of claim 18, wherein the at least one reducing agent is selected from the group consisting of hydrazines, iodides, phosphines, phosphites, sulfides, sulfites, hydrosulfites, borohydrides, cyanoborohydrides, aluminum hydrides, boranes, hydroxylamine, diimine, dissolving metal reductions, hydrogen, and combinations thereof.

20. The method of claim 18, wherein the at least one reducing agent comprises hydrazine.

21. The method of claim 18, wherein the at least one reducing agent comprises hydrogen.

22. The method of claim 18, further comprising:
   esterifying the chemically converted graphene to form an esterified, chemically converted graphene.

23. The method of claim 18, further comprising:
   reacting the chemically converted graphene with a derivatizing agent to form a functionalized, chemically converted graphene.

24. The method of claim 18, wherein the derivatizing agent comprises an aryl diazonium species.

25. The method of claim 23, further comprising:
   esterifying the functionalized, chemically converted graphene to form an esterified, functionalized, chemically converted graphene.

26. A method comprising:
   providing a graphite source;
   providing a solution comprising at least one acid solvent, potassium permanganate and at least one protecting agent, wherein the at least one protecting agent is operable for protecting vicinal diols;
   wherein the at least one acid solvent is selected from the group consisting of oleum, sulfuric acid, fluorosulfonic acid, trifluoromethanesulfonic acid, and combinations thereof; and
   wherein the at least one protecting agent is selected from the group consisting of trifluoroacetic acid; boric acid; trifluoroacetic anhydride; boric anhydride; and combinations thereof;
   mixing the graphite source with the solution, wherein the mixing comprises stirring the graphite source with the solution; and
   wherein the stirring results in the oxidizing of the graphite source with the potassium permanganate in the presence of the at least one protecting agent to form graphene oxide, wherein the at least one protecting agent protects vicinal diols during the stirring.

27. The method of claim 26, wherein the at least one acid solvent comprises sulfuric acid.

28. The method of claim 26, wherein oxidizing the graphite source takes place at a temperature between about 30° C. and about 85° C.

29. The method of claim 26, wherein the graphene oxide is operable to slow the filtration rate of a liquid mixture selected from the group consisting of an aqueous liquid mixture, a non-aqueous liquid mixture, and combinations thereof.

* * * * *